United States Patent
Huang et al.

(10) Patent No.: US 9,450,676 B2
(45) Date of Patent: Sep. 20, 2016

(54) VARIABLE LINE-RATE OPTICAL TRANSMITTER BY MODULATION FORMAT HOPPING USING ELECTRICAL-OPTICAL-ELECTRICAL EOE GENERATED QAM SIGNAL

(75) Inventors: Yue-Kai Huang, Princeton, NJ (US); Ezra Ip, Plainsboro, NJ (US); Philip Nan Ji, Plainsboro, NJ (US)

(73) Assignee: NEC Corporation (JP)

( * ) Notice: Subject to any disclaimer, the term of this patent is extended or adjusted under 35 U.S.C. 154(b) by 45 days.

(21) Appl. No.: 13/517,683

(22) Filed: Jun. 14, 2012

(65) Prior Publication Data

US 2012/0321323 A1     Dec. 20, 2012

Related U.S. Application Data

(60) Provisional application No. 61/497,992, filed on Jun. 17, 2011.

(51) Int. Cl.
*H04B 10/50*    (2013.01)
*H04B 10/54*    (2013.01)

(52) U.S. Cl.
CPC ...... *H04B 10/5053* (2013.01); *H04B 10/5055* (2013.01); *H04B 10/541* (2013.01)

(58) Field of Classification Search
CPC .............. H04B 10/5161; H04B 10/50–10/588
USPC ........ 398/162, 183, 185, 192, 182; 375/261, 375/286, 298; 359/237, 238
See application file for complete search history.

(56) References Cited

U.S. PATENT DOCUMENTS

| | | | |
|---|---|---|---|
| 2003/0039438 A1* | 2/2003 | Gertsvolf et al. | H04B 10/2916 385/27 |
| 2004/0141569 A1* | 7/2004 | Agazzi | 375/302 |
| 2007/0253468 A1* | 11/2007 | Pettersen et al. | 375/146 |
| 2008/0056730 A1* | 3/2008 | Nojima et al. | 398/187 |
| 2009/0196602 A1* | 8/2009 | Saunders et al. | 398/26 |
| 2011/0052209 A1* | 3/2011 | Gupta et al. | 398/186 |
| 2013/0216232 A1* | 8/2013 | Zanoni et al. | 398/79 |

OTHER PUBLICATIONS

Yu et al, 112.8-Gb/s PM-RZ-64QAM optical signal generation and transmission on a 12.5GHz WDM grid (published in OFC/NFOEC, Mar. 2010, pp. 1-3).*
Yu et al, A Novel Scheme to Generate 112.8-Gb/s PM-RZ-64QAM Optical Signal (published in IEEE Photonics Technology Letters, vol. 22, No. 2, Jan. 15, 2010).*
Yu et al, Ultra-High-Capacity DWDM Transmission System for 100G and Beyond (published in IEEE Communications Magazine, Mar. 2010).*

* cited by examiner

*Primary Examiner* — David Payne
*Assistant Examiner* — Casey Kretzer
(74) *Attorney, Agent, or Firm* — Joseph Kolodka

(57) ABSTRACT

The present method is for generating a 4-level optical signal and it includes providing a continuous wave CW optical source; modulating the CW optical source with a first intensity modulator driven by a binary electrical signal a n Gbits/s to generate an optical signal; employing a second intensity modulator as a pulse carving modulator that is driven by an RF signal at n GHz thereby generating a 4 level optical signal for subsequent detection by a receiver.

6 Claims, 3 Drawing Sheets

VARIABLE LINE-RATE OPTICAL TRANSMITTER BY MODULATION FORMAT HOPPING USING ELECTRICAL-OPTICAL-ELECTRICAL EOE GENERATED QAM SIGNAL

This application claims the benefit of U.S. Provisional Application No. 61/497,992, entitled "Variable Line-Rate Optical Transmitter By Modulation Format Hopping Using EOE (electrical-optical-electrical) Generated QAM Signal", filed Jun. 17, 2011, and is related to U.S. patent application Ser. No. 12/694,483, entitled "High-Speed Multi-Level Electronic Signal generation for Optical Communications", filed Jan. 27, 2010, of which the contents of both are incorporated herein by reference.

BACKGROUND OF THE INVENTION

The present invention relates generally to optical communications and more particularly to a Variable Line-Rate Optical Transmitter By Modulation Format Hopping Using EOE (electrical-optical-electrical) Generated QAM Signal.

Over the last half decade, the optical carriers have seen exponential growth in network traffics due to bandwidth hungry applications such as data center backhaul, file sharing, cloud computing, high definition video-on-demand, etc. Even as 100 Gb/s/λ systems are being commercially deployed, the growth in bandwidth demand is driving carriers and system vendors to look for technologies beyond 100 G. To achieve high spectral efficiency, future systems will use multi-dimensional modulation formats like quadrature amplitude modulation (QAM) combined with coherent detection and digital signal processors.

Moreover, next generation optical networks will include flexible routing technology such as wavelength selective switches (WSS) to allowing coexistence of mixed line-rates for efficient spectrum usage. In a flexible network management environment, it is desirable to allow these application-specific data channels to dynamically vary its rate according to the application's real-time demand and corresponding link conditions, instead of just using prefixed line-rates like what is done conventionally. When operating at a fixed optical bandwidth, variable must be achieved by dynamically changing signal modulation formats, a challenging task to accomplish with current 100 GbE technologies.

In order to design a transmitter system that supports dynamic change of bit rate, the key challenge is the generation of large quadrature amplitude modulation QAM constellations at high baud rate. In a U.S. patent application no. US 2009/019662 A1, to Saunders et al., digital-to-analog converters (DAC) are used to generate the multi-level signals for optical QAM modulation. Variable line-rate can then be achieved by mapping the signal to different QAM constellation digitally. However, present day high-speed DACs seldom operate beyond ~10-GHz bandwidth and therefore the teaching of Saunders et al. is impractical for implementing line-rates above 100 Gb/s. Obtaining multi-level electrical signals using passive combination of multiple wideband binary streams is also very challenging because of unavailability of high-quality broadband electrical components.

Accordingly, there is a need for an improved transmitter that supports dynamic change of bit rate involving a QAM signal.

BRIEF SUMMARY OF THE INVENTION

The Present Invention

These and other advantages of the invention will be apparent to those of ordinary skill in the art by reference to the following detailed description and the accompanying drawings.

DETAILED DESCRIPTION

The related patent application noted above and incorporated herein by reference, uses a so called "electrical-optical-electrical (EOE)" multilevel signal generation technique. It allows production of a high quality multi-level signal for QAM generation using optical signal processing. The EOE technique also has one advantage, the ease of increasing/reducing the number of signal levels by adding/removing lasers being used in the setup. Combined with DFB lasers with programmable optical power, the present invention can achieve dynamic modulation format hopping between different QAM constellations to achieve various channel line-rate adjustment by changing transmitted bits/symbol.

Figure 1:
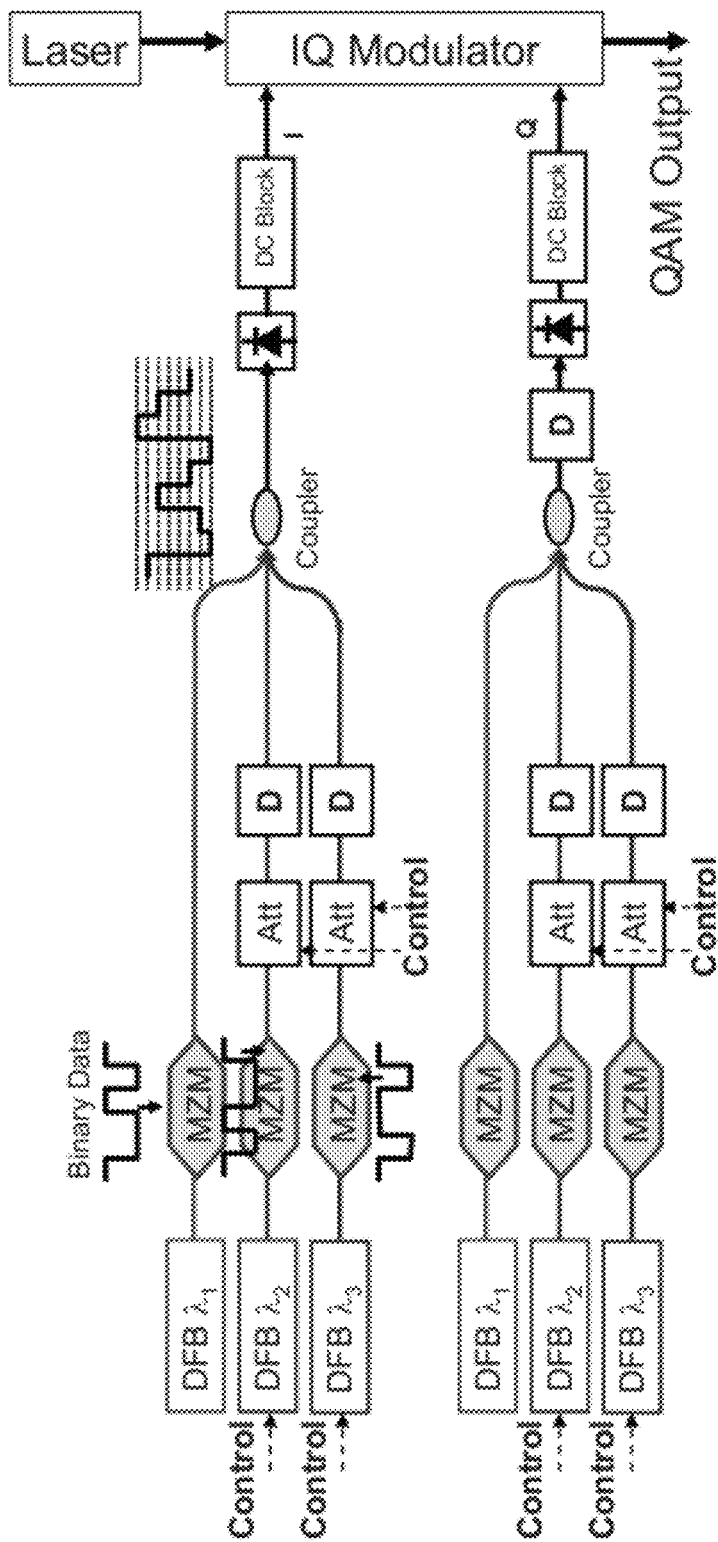
FIG. 1 is a diagram of an exemplary EOE based multi-level technique for generating a QAM signal, in accordance with the invention.

The diagram of FIG. 1 shows the EOE based multi-level technique for generating a QAM signal. N different distributed feedback (DFB) laser sources, with frequency spacing larger than the photo-receiver bandwidth, are modulated in intensity with binary data streams. When these modulated laser sources have different weights in power, the optical signal, after they are combined, will have a total of $2^N$ levels. Optical delay elements are used to align the transition edges in time from multiple sources. After photo-detection, the generated multi-level signal with DC component removed is used to drive one side of the I/Q modulator. The other side can also be driven by another multi-level signal using the same scheme to produce QAM signal at the output of the I/Q modulator.

Figure 2:
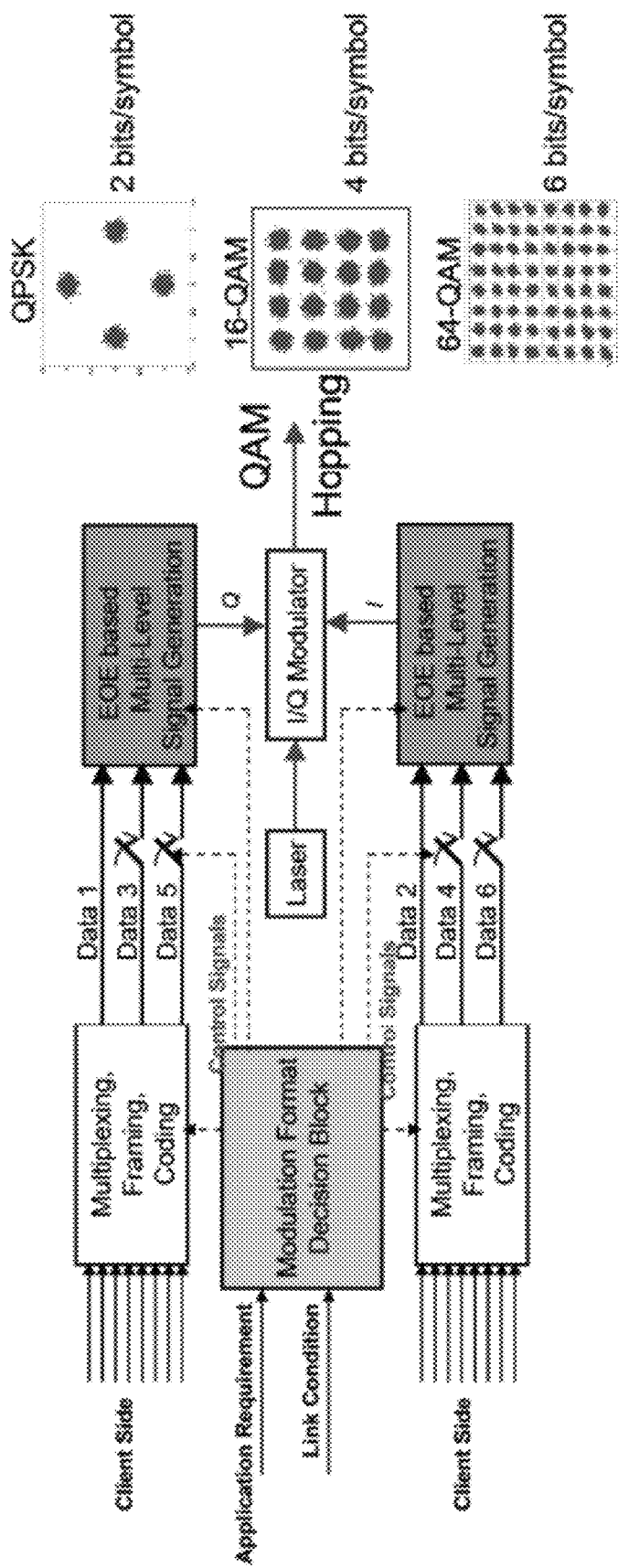
FIG. 2 shows an exemplary functional block diagram for deciding which modulation format for FIG. 1 is to be used based on the application requirements and link condition, in accordance with the invention.

In order to hop between different QAM constellations, (QPSK, 16-QAM, 64-QAM, or even larger constellation), a functional block will decide which modulation format to use based on the application requirements and link condition (see FIG. 2). This can be implemented using a simple look-up table. Once a format is determined, the modulation format decision block will send out control signals to other modules (multiplexing framing coding blocks, EOE based multi-level signal generation blocks) to set the operation accordingly. For example, it will decide how many data it will take from the client side for multiplexing/framing/coding, how many data will be transferred to EOE multi-level module, and how they will be handled inside the module.

When focused on the operation inside the EOE multi-level module, QAM hopping can be done in two ways. One way is to use the control signals to turn the DFB laser on and off according to the number of levels needed to generate the QAM signal. For example: 1 laser for QPSK, 2 lasers for 16-QAM, 3 lasers for 64-QAM and so on. Another way is to use programmable attenuators for laser power weight assignment. When number of levels needs to be reduced, an extremely large attenuation value, say >25 dB, can be applied to the programmable attenuator to block the signal path.

Figure 3:
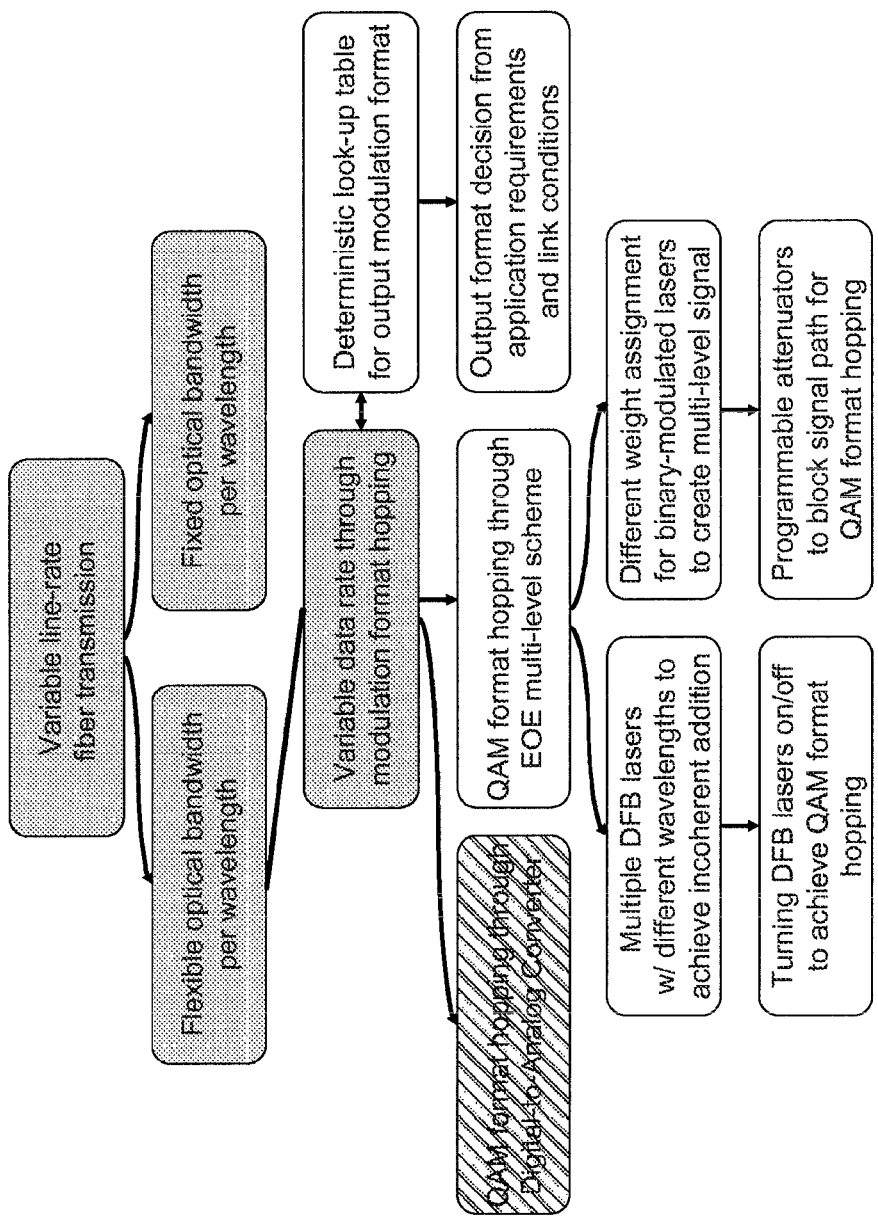
FIG. 3 is a block diagram of key aspects of the inventive variable line rate transmitter by a modulation format using an EOE generated QAM signal.

Referring now to the block diagram of FIG. 3, key aspects of the present invention are highlighted. The inventive variable line-rate transmission provides for a flexible optical bandwidth per wavelength or a fixed optical bandwidth per wavelength. The flexible optical bandwidth per wavelength enables a variable data rate through modulation format hopping that entails a deterministic look up table for an appropriate output modulation format. The deterministic table enables an output format decision from application requirements and link conditions.

The variable data rate through modulation format hopping entails a QAM format hopping through a digital-to-analog converter and a QAM format hopping through EOE multi-level scheme. The QAM format hopping through EOE multi-level scheme entails multiple DFB lasers with different wavelengths to achieve incoherent addition of different weight assignment for binary-modulated lasers to create a multi-level signal. The DFB lasers are truned on/off to achieve QAM format hopping. Programmable attenuators are used to block a signal path for QAM format hopping.

From the foregoing it can be appreciated that using an EOE-based multi-level to achieve QAM format hopping is completely different than what has heretofore been proposed or achieved. The present inventive EOE-based technique has much better performance in signal bandwidth because it is not limited by DAC bandwidth. One can achieve QAM format hopping on the fly by simply turning on/off the DFB lasers or adjust attenuation values through programmable attenuators. The number of signal levels, $2^M$, will be determined by number of optical wavelengths presented, M. The generated QAM constellation will be $2^M \times 2^M$. By converting the baseband signal to optical domain, generating a multi-level signal on optical carriers is considered narrow band operation and therefore quite easy. This allows one to achieve signal bandwidth unreachable by current DAC technology. The key step to achieve QAM format hopping on the fly is to have control signals connected either to the DFB lasers' on/off switch or to the programmable attenuators' inputs. The format can then be changed at same rate as the tuning speed of these devices.

From the foregoing, it can be further appreciated that the EOE technique by applicants allows generation of large QAM constellations at high-baud rates (>40 GHz) unattainable with current DAC products. The high-speed operation allows us to dynamically change rates on channels with optical bandwidth between 25 GHz~50 GHz, which matches well with current and future network design. Since the EOE technique converts binary (usually the format coming from the client's side) inputs directly into QAM, it will not require additional DSP hardware for signal constellation mapping, resulting in less complexity in transmitter design. Moreover, the signal quality of the EOE generated QAM signal cannot be rivaled by other multi-level generation techniques purely done using wide-band electronics.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for varying a line-rate for optical transmission via selective quadrature amplitude modulation (QAM) constellations, comprising the steps of:
    generating an electrical-optical-electrical based QAM signal using N different distributed feedback (DFB) laser sources, with frequency spacing larger than a photo-receiver bandwidth, and modulated in intensity with binary data streams, wherein the modulated laser sources have different weights in power, and combining the optical signal to provide a total of 2N levels;
    using optical delay elements to align transition edges in time from multiple sources;
    after photo-detection, using the generated multi-level signal with DC component removed to drive an I/Q modulator; and
    influencing a modulator in said generating step to achieve dynamic modulation format hopping between different QAM constellations for varying channel line-rate adjustment by changing transmitted bits or symbol;
    wherein said hopping between different QAM constellations comprises using control signals to turn laser sources in said generating step on and off according to a number of signal levels needed to generate said QAM signal.

2. The method of claim 1, wherein QAM constellations are generated to dynamically change rates on channels with optical bandwidth between 25 GHz to 50 GHz.

3. The method of claim 1, wherein said influencing step comprises a QAM constellation that will be 2M times 2M, wherein M is an integer.

4. A method for varying a line-rate for optical transmission via selective quadrature amplitude modulation (QAM) constellations, comprising the steps of:
    generating an electrical-optical-electrical based QAM signal using N different distributed feedback (DFB) laser sources, with frequency spacing larger than a photo-receiver bandwidth, and modulated in intensity with binary data streams, wherein the modulated laser sources have different weights in power, and combining the optical signal to provide a total of 2N levels;
    using optical delay elements to align transition edges in time from multiple sources;
    after photo-detection, using the generated multi-level signal with DC component removed to drive an I/Q modulator; and
    influencing a modulator in said generating step to achieve dynamic modulation format hopping between different QAM constellations for varying channel line-rate adjustment by changing transmitted bits or symbol;
    wherein said hopping between different QAM constellations comprises using programmable attenuators for assigning weights to laser sources in said generating step thereby reducing number of signal levels needed to generate said QAM signal by using an increased attenuation value to block a signal path.

5. The method of claim 4, wherein QAM constellations are generated to dynamically change rates on channels with optical bandwidth between 25 GHz and 50 GHz.

6. The method of claim 4, wherein said influencing step comprises a QAM constellation that will be 2M times 2M, wherein M is an integer.

* * * * *